United States Patent Office 3,204,013
Patented Aug. 31, 1965

3,204,013
LIGHT STABILIZED COMPOSITIONS COMPRISING POLYVINYL CHLORIDE, POLYURETHANE AND ETHYLENE OXIDE
Carroll H. Osborn, Waynesville, and Doyle V. Haren, Clyde, N.C., assignors to Dayco Corporation, Dayton, Ohio, a corporation of Ohio
No Drawing. Filed May 23, 1961, Ser. No. 111,930
10 Claims. (Cl. 260—859)

This invention relates to a novel composition of matter and more particularly to light stabilized elastomeric material formed from a polyvinyl chloride and a thermoplastic polyurethane polymer.

Synthetic elastomeric materials have been found to have many uses in industry enabling manufacturers of goods to utilize their properties, lightness of weight, elasticity and low cost. For example, the vinyl plastics have been employed to make acceptable pressure and vacuum hose, pressure sensitive tape, automobile trim parts, etc., however, the tensile strength of the material leaves something to be desired. It has been discovered that compounding an elastomer of the polyvinyl chloride type with a thermoplastic polyurethane elastomer improves many of the undesirable characteristics of the polyvinyl chloride and generally increases the tensile strength elongation and tear strength of the compounded product. It has also been discovered during processing of the polyurethane-polyvinyl chloride elastomer or polyblend that the finished product exhibits relatively poor stability to light and upon exposure to light the finished product exhibits a tendency to turn a deep shade of brown.

Since many of the products formed of the polyurethane-polyvinyl chloride elastomers or polyblends are to be used in vacuum cleaner hose, furniture webbing, automobile trim parts and the like, it is desirable to provide a product capable of being compounded into several attractive colors, wherein the products exhibit relatively little, if any, tendency to fade or vary in color. In the case of products formed of the stable basic colors such as deep red, deep blue and violet and the like, fading is not as noticeable as is the case with the light pastel shades which have in recent years become increasingly popular. With these light colors a small amount of discoloration may be very noticeable.

It is a primary object of this invention to provide an elastomeric composition of the type described which is relatively stable to light.

This has been successfully accomplished in accordance with the present invention by incorporating a light stabilizing agent into the polyurethane-polyvinyl chloride elastomer so as to impart to the finished product considerable stability on exposure to electromagnetic radiation. It is to be noted that the term electromagnetic radiation is intended to include radiation extending from infrared to ultraviolet as well as light in the visible range.

Another object of this invention is to provide an elastomeric product having improved strength and considerable light stability in the presence of electromagnetic radiation.

Another object of this invention is the provision of a process for rendering elastomeric materials color stable in the presence of electromagnetic radiation.

A still further object of this invention is the provision of polyurethane-polyvinyl chloride elastomer which is rendered relatively light stable by incorporation therein of relatively small amounts of a light stabilizing agent.

These objects and other objects of the invention will be readily apparent from the following description and claims:

Polyurethane-polyvinyl chloride elastomers of the type to which this invention relates have been disclosed in an Osborn et al. application, Serial No. 20,023, filed April 5, 1960, now abandoned, of common assignment.

As is diclosed in the above application, the polyblend may be prepared in two steps, the first including compounding a polyvinyl chloride by blending the ingredients on a mill or internal mixer of the type which is found in rubber or plastics processing plants. After the compounding has taken place, a thermoplastic polyurethane polymer in sheet or block form is added within the mill and blended completely with a solid polyvinyl chloride elastomer. The polyurethane may be of the type often referred to as a poly (ester urethane) elastomer available under the trademark "Estane VC," and described in "Rubber World" for January 1958 as a linear polymer prepared from diphenylmethane-p,p'-diisocyanate, adipic acid and butanediol-1,4, and having an average molecular weight of about 36,000. This polymer particularly lends itself to milling and mixing operations.

In order to provide the required light stability to the polyblend approximately 2 to 5 parts by weight of a light stabilizing agent are added to either the polyvinyl chloride or the polyurethane during processing of each of these components, if they are separately processed, and in the case where both of these components are processed in the same mill or mixer, all components may be combined at the same time without varying results obtained.

Tests of the untreated polyurethane-polyvinyl chloride elastomer show that the same browned considerably upon exposure to light. With one part of the light stabilizing agent, considerable fading of the polyblend resulted and as additional amounts of light stabilizing agent were added fading was reduced considerably. It was discovered that the addition of 3, 4 and 5 parts exhibited little significant alteration in the stability of the final product over that obtained with the use of two parts of the light stabilizing agents.

It is preferred to employ as a light stabilizing agent ethylene oxide in amounts ranging from about 2 to 5 parts by weight per 100 parts of polyblend, although satisfactory results have also been achieved by intermixing the ethylene oxide with any of the well-known vinyl stabilizers. Particularly acceptable results have been achieved by the use of a mixture of ethylene oxide and an alkyl aryl phosphite.

In preparing the light stabilizing polyblend in accordance with the present invention, a polyvinyl chloride is compounded by blending the individual ingredients on a mill or internal mixer of the type which is found in rubber or plastic processing plants. A particular formulation for preparing this polyvinyl chloride is as follows:

| | Parts by weight |
|---|---|
| Polyvinyl chloride resin | 100 |
| Dioctyl phthalate | 40 |
| Epoxidized soybean oil plasticizer | 10 |
| Cadmium barium phenol stabilizer | 3 |
| Stearic acid | 0.5 |
| Titanium oxide | 2 |
| Organic color | 0.5 |
| Total | 156.0 |

The above polyvinyl composition represents one of the many possible compositions which may be employed to form a polyblend. Subsequent to formulation of the polyvinyl chloride, about 150 parts by weight of a thermoplastic polyurethane polymer in sheet or block form is added within the mill and completely blended with the polyvinyl chloride material. As was stated previously, the light stabilizing agent may be added to either the polyvinyl chloride during formulation thereof or added to the polyvinyl chloride at the same time that the solid polyurethane is added thereto.

Extremely acceptable results have been achieved by the addition of 5 parts of ethylene oxide and 3 parts of the alkyl aryl phosphite to the 300 parts of polyblend formulated as above described such that approximately 2.5 parts by weight of light stabilizing agent is present per each 100 parts of the polyblend. It is to be understood, however, that it is also possible to employ the ethylene oxide alone in the amounts previously mentioned, and acceptable results have likewise been achieved. The desirability of employing a polyblend will become apparent by the following comparison between a conventional polyvinyl chloride composition and the polyblend formulated as above described:

|  | Conventional Polyvinyl Chloride Compound | Polyvinyl Chloride Polyurethane Compound |
|---|---|---|
| Tensile strength _____ p.s.i__ | 23-2,600 | 4,000 |
| Ultimate elongation _____ percent__ | 360 | 550 |
| Tear strength _____ p.s.i__ | 300 | 575 |
| 100% modulus _____ p.s.i__ | 1,100 | 1,700 |
| Shore A Hardness _____ | 85 | 85 |

When the above compositions were thermoplastic formed, as by extruding, into a tube and used to form a vacuum cleaner hose as previously described, the completed hoses were again compared with the following results:

|  | Conventional Polyvinyl Chloride Compound | Polyvinyl Chloride Polyurethane Compound |
|---|---|---|
| Flex test _____ flexes__ | 10-20,000 | 450,000 |
| Snap test _____ | [1] 8-10 | [2] 50 |
| Hot and cold cracking test _____ cycles__ | 8-9 | 20-22 |
| Time to uncoil at minus 10° F___seconds__ | 70 | 20 |

[1] Whips (breakage).
[2] Whips (no failures).

As was mentioned previously, the light stability of the polyblends above described in the absence of any light stabilizing agent limits the use thereof due to the sensitivity of the polyblend upon exposure to electromagnetic radiation, as above described. The incorporation of between 2 to 5 parts by weight of a light stabilizing agent per 100 parts of polyblend, wherein the light stabilizing agent may be either ethylene oxide, or ethylene oxide in combination with any of the well-known vinyl stabilizers, and particularly the alkyl aryl phosphites noted above, has provided a novel polyblend exhibiting remarkable stability to electromagnetic radiation thereby allowing formulation of polyblend products in various colors especially the light pastel shades.

One aspect of the invention relates to the ease of processing of the polyblend material attributable to the plasticizing action of the solid polyurethane on the vinyl composition. This plasticizing action is significant due to the fact that the addition of a solid plasticizer to solid vinyl chloride while offering the several well-known advantages of employing a plasticizer also provides a product of superior strength over that achieved or possible by the use of a liquid polyurethane plasticizer or other liquid plasticizers.

Ethylene oxide is one of a series of compounds generically identified as epoxides and the three-membered ring of ethylene oxide is less stable than the high-membered rings. Additionally, ethylene oxide exhibits a tendency to react more rapidly than the remaining oxides of the epoxide group. It can be understood, therefore, that other epoxides may be employed under certain circumstances with a corresponding increase in amount in order to provide a light stabilizing action previously noted.

It has been noted further that the use of ethylene oxide with a polyurethane material operates to provide a considerable amount of light stabilization but does not provide the high order of stabilization possible with the polyblend formulations. Accordingly, the use of ethylene oxides alone or in combination with the other additives previously noted, may provide an agent capable of effecting light stabilization of polyurethane materials alone or in combination with other materials which may be added to the polyurethane to vary the physical characteristics thereof in accordance with the particular need. While the above polyblend formulation is preferred since it provides the maximum strength and elongation characteristics, it is to be understood that the ratio of polyvinyl chlovides the maximum strength and elongation characteris- in the physical properties of the final product such as elongation and tensile strength.

While the products and methods herein described constitute preferred embodiments of the invention, it is to be understood that the invention is not limited to these precise products or methods, and that changes may be made therein without departing from the scope of the invention which is defined in the appended claims.

We claim:

1. A composition of matter comprising a mixture of polyvinyl chloride and a thermoplastic polyurethane elastomer and about 2 to 5 parts by weight of ethylene oxide per 100 parts of said mixture; said polyurethane being the reaction product of diphenyl-methane-p,p'-diisocyanate, adipic acid, and butanediol-1,4, and having an average molecular weight of about 36,000.

2. A composition of matter in accordance with claim 1 wherein the proportions of said polyvinyl chloride and said polyurethane in said mixture are approximately equal.

3. A composition of matter comprising a mixture of polyvinyl chloride and a thermoplastic polyurethane elastomer and about 2 to 5 parts by weight of a mixture of ethylene oxide and an alkyl aryl phosphite per 100 parts of said mixture; said polyurethane being the reaction product of diphenylmethane-p,p'-diisocyanate, adipic acid, and butanediol-1,4, and having an average molecular weight of about 36,000.

4. A composition of matter in accordance with claim 3 wherein the proportions of said polyvinyl chloride and said polyurethane in said mixture are approximately equal.

5. A vacuum cleaner hose made of the composition of matter of claim 1.

6. A vacuum cleaner hose made of the composition of matter of claim 3.

7. A method of forming a light stabilized elastomer comprising intermixing about 50 parts of a thermoplastic polyurethane elastomer, 50 parts of a polyvinyl chloride, and about 2 to 5 parts by weight of ethylene oxide; said polyurethane being the reaction product of diphenylmethane-p,p'-diisocyanate, adipic acid, and butanediol-1,4, and having an average molecular weight of about 36,000.

8. A method in accordance with claim 7 wherein said ethylene oxide is added to one of the components in said mixture during the processing of said component.

9. A method of forming a light stabilized elastomer comprising intermixing about 50 parts of a thermoplastic polyurethane elastomer, 50 parts of a polyvinyl chloride, and about 2 to 5 parts by weight of a mixture of ethylene oxide and an alkyl aryl phosphite; said polyurethane being the reaction product of diphenylmethane-p,p'-diisocyanate, adipic acid, and butanediol-1,4, and having an average molecular weight of about 36,000.

10. A method in accordance with claim 9 wherein said ethylene oxide is added to one of the components in said mixture during the processing of said component.

(References on following page)

References Cited by the Examiner

UNITED STATES PATENTS

| | | | |
|---|---|---|---|
| 2,166,604 | 7/39 | Meyer | 260—45.8 |
| 2,462,422 | 2/49 | Plambeck | 260—45.8 |
| 2,606,162 | 8/52 | Coffey et al. | 260—22 |
| 2,872,430 | 2/59 | Parker et al. | 260—859 |
| 2,888,433 | 5/59 | Parker | 260—859 |
| 2,898,312 | 8/59 | Szukiewicz et al. | 260—859 |

OTHER REFERENCES

Schollenberger et al.: Polyurethane VC a Virtually Cross-Linked Elastomer, in Rubber World, January 1958.

MURRAY TILLMAN, *Primary Examiner.*

LEON J. BERCOVITZ, WILLIAM H. SHORT,
*Examiners.*